United States Patent Office 3,359,982
Patented Dec. 26, 1967

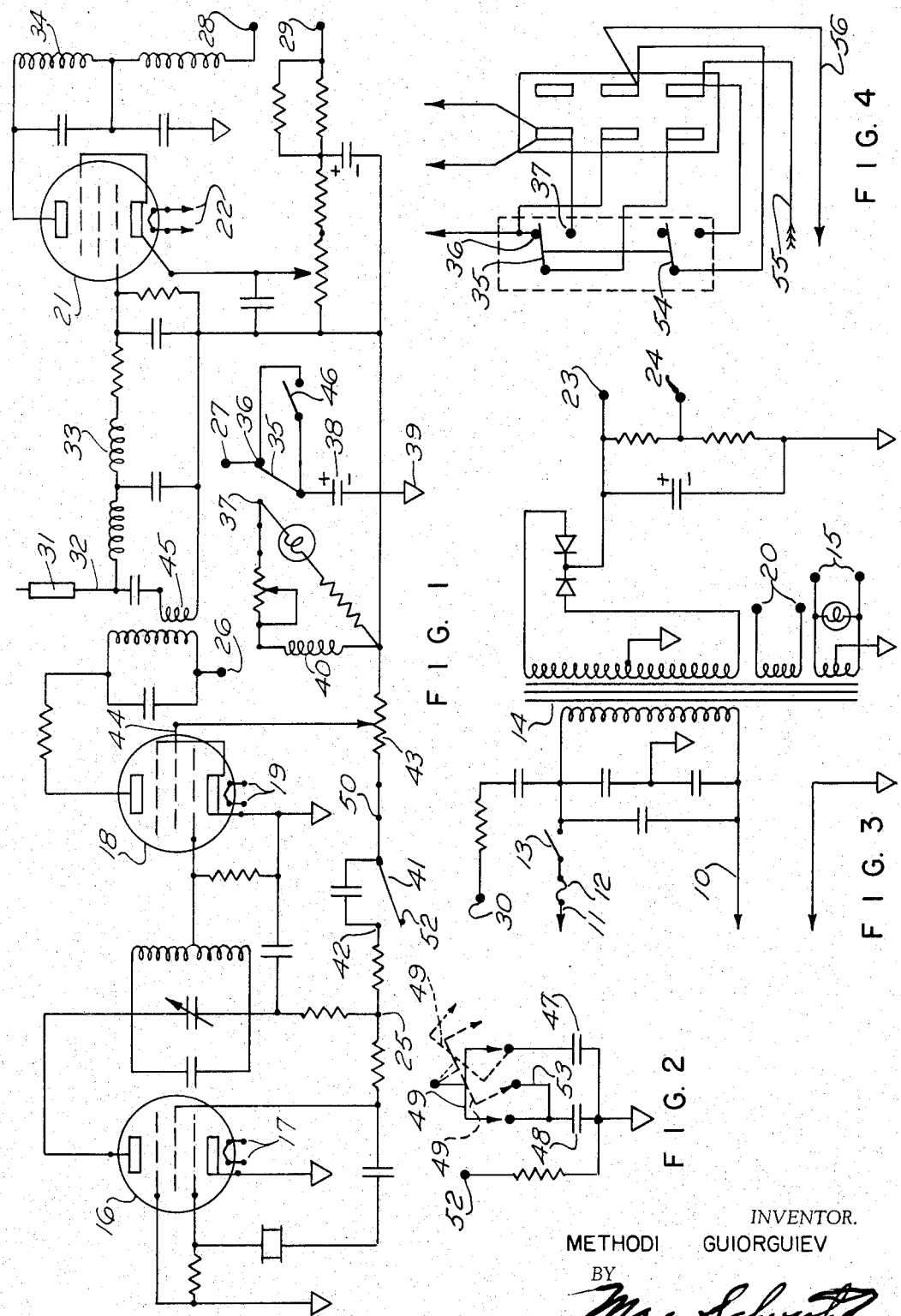

3,359,982
SENSING CONTROL FOR A SURGICAL NEEDLE
OR INSTRUMENT
Methodi Guiorguiev, 241 Knollwood Ave.,
Cranston, R.I. 02910
Filed Feb. 8, 1965, Ser. No. 431,015
13 Claims. (Cl. 128—303.18)

ABSTRACT OF THE DISCLOSURE

A sensing control circuit for operating a surgical needle on contact with the human body. Means are provided for applying an AC field to the human body. The circuit picks up the AC signal on contact and uses it to trigger a switch which sets off a charged condenser for applying an operating current to the needle. Means may be provided for delaying the action or for by-passing the automatic feature for a manual control of the charge.

My present invention relates to a surgical instrument and more particularly to a novel sensing control circuit for firing the instrument.

The principal object of the present invention is to provide a sensing circuit for a surgical instrument which is sensitive to an AC field around a human body.

Another object of the present invention is to provide a surgical needle with a sensing circuit which causes the needle to discharge on contact with the human body.

A further object of the present invention is to provide a surgical instrument having a sensing circuit designed to discharge on contact with the human body but equipped with a delayed action to permit the manipulation of the instrument prior to discharge.

Another object of the present invention is to provide a surgical instrument with a sensing circuit which can be readily superimposed on the conventional instrument discharge circuit for either automatic or manual control.

A further object of the present invention is to provide a surgical instrument with a sensing circuit which is simple in construction and easy and economical to manufacture and assemble.

With the above and other objects and advantageous features in view, my invention consists of a novel arrangement of parts, more fully disclosed in the detailed description following, in conjunction with the accompanying drawings, and more particularly defined in the appended claims.

In the drawings,

FIG. 1 is a diagrammatic view of a surgical instrument operating circuit provided with the sensing circuit of the present invention.

FIG. 2 is a diagram of a delayed action control which can be hooked into the circuit shown in FIG. 1.

FIG. 3 is a diagrammatic view of the power supply unit for the operating and control circuit shown in FIG. 1.

FIG. 4 is a diagram of the board hookup for the device.

Surgical instruments are used by doctors and dentists for cutting or cauterizing by means of an electrical discharge through the instrument. The most common use for such an instrument is for depilatory operations. In such instances the instrument is introduced into the skin adjacent a hair follicle and the electrical impulse is used to destroy the unwanted hair. In my Patent No. 3,035,580 issued May 22, 1962, and entitled, Surgical Needle, I have illustrated one form of such a device. In the operation of these instruments, AC current is rectified to DC. It is then oscillated and amplified. The resultant current is now fired through the needle or surgical instrument by means of a foot switch used by the operator. This is the conventional operating device. The present invention is designed to improve upon the operation of the surgical instrument by replacing the foot switch with a sensing circuit which energizes the instrument on contact with the human body. When a human body is in close proximity to an AC field it picks up a field of AC current with the capability of transmitting it on contact. The circuit of the present invention is designed to pick up the AC current on contact with the skin and use it to trip the operating circuit and discharge electric energy through the instrument. Means are also provided for delaying the discharge and thus permitting proper manipulation of the surgical instrument in position prior to the discharge.

The main circuit is illustrated in FIG. 1, but power is supplied to it in the diagrammatic hookup shown in FIG. 3. The conventional 110 v. AC line is supplied through the leads 10 and 11, the line 11 having the usual fuse 12 and manually operable switch 13. The AC current entering through wires 10 and 11 is run through a conventional rectifier and transformer 14 to provide different AC and DC values for different parts of the circuit. For example, taps 15 supply 6 v. current to the filament 17 of the oscillator circuit tube 16 and also to the filament 19 of the power beam amplifier tube 18. Similarly taps 20 supply 5 v. current to the filament 22 of the thyratron tube 21. At the right end of the circuit, the tap 23 supplies 450 v. DC and the tap 24 supplies 250 v. DC. The 450 v. line 23 is connected to the oscillating circuit at 25 and to the amplifier tube and circuit at 26. The 250 v. line 24 is connected to the control circuit at 27. In addition to the foregoing the 110 v. line 11 is tied into the control circuit at 28 to supply AC current at this point. The 450 v. DC line is also tied into the control circuit at 29.

As has been herein above mentioned, when the human body is in the proximity of an AC conductor it has the property of picking up an AC field and transmitting it on touch. The sensing circuit of the present invention is designed to pick up this AC field and fire the surgical instrument on contact with the human body. In most installations there will be lamps or other devices in the same room which will induce an AC field to the patient. However, to make sure of proper operation, the power circuit shown in FIG. 3 may be provided with a 110 v. AC jack 30 which will allow a length of cord to be plugged in and positioned under a person's chair or across his lap or even around his body. In operation, a conventional holder 31 is equipped with a depilatory needle or any other type of surgical instrument being used. As the needle or surgical instrument comes in contact with the human body an AC signal or voltage is fed from the body through the output cord 32 and chokes 33 to the grid of the thyratron tube 21. If desired the thyratron tube can be replaced with a solid state device which fires or becomes conductive on the application of the AC signal voltage. Now the solid state device or thyratron tube 21 energizes a relay 34 which moves a switch 35 from contact 36 to contact 37.

When the switch 35 is bearing against contact 36, the condenser 38 is charged between the 250 v. connection 27 and the ground 39. But when the relay 34 is energized and throws the switch 35 across into contact with the contact point 37, it causes the condenser 38 to discharge its energy through a relay 40. This closes the switch 41 so that it comes in contact with the contact point 42 and allows the supply of 450 v. current to flow from the point 25 across the switch 41 to the potentiometer 43 and the grid 44 of the tube 18. This allows the tube 18 to conduct and supply RF to the output coil 45, cord 32 and surgical needle or instrument to the human body.

In addition to the foregoing, a further control may be applied at a manually operable switch 46 in the control circuit for the relay 40. When the switch 46 is in open position, as illustrated in FIG. 1, the condenser 38 discharges its energy through the relay coil 40 when the switch 35 is in contact with the contact point 37. This discharge time is proportional to the size of the condenser. As soon as the condenser is discharged the relay coil 40 ceases to be energized. Thus the output RF is on for short periods of time or for the length of time the relay coil 40 is energized. This produces an automatic timing control dependent on the value of the condenser 38. Now, if the switch 46 is closed, the 250 v. current from the tap point 27 will be supplied directly and continuously to the relay coil 40, thus perpetually energizing the relay coil. Now when the switch 35 is moved into contact with the point 37, the RF output is continuously on. This produces a manual timing control. With the above construction, if the switch 46 is left in open position as illustrated in FIG. 1 the timing control will be short and automatic. However, a manual or foot pedal operation can be provided so that the switch 46 can be closed and kept closed for as long a period of time as it is desired to continue the RF output.

In the circuit illustrated in FIG. 1, the electrical energy is discharged through the needle or surgical instrument virtually on contact with the human body. However, some manipulation of the needle or other surgical instrument before the actual firing of the electrical discharge may be necessary and a controlled delay is preferred. This control mechanism is illustrated in FIG. 2. It consists of a pair of grounded condensers 47 and 48 and a three position switch 49 which is tied into the circuit at 50. The ground side of the condensers is tied into the circuit at 52 which is the lowermost contact point for the switch 41. When the switch 49 is in the dotted line position in FIG. 2, it will be noted that the arm at the left side contacts only the condenser 47. When it is in the dotted line intermediate position so that the left side contacts the arm 53, the switch is in contact with the condenser 48. In the full line position shown in FIG. 2, one arm is contacting the line to the condenser 48 and the other arm is contacting the line to the condenser 47 so that both condensers are contacted by the switch.

Without the circuit shown in FIG. 2, the voltage is instantaneously discharged across the switch 41 in closed position, through the potentiometer 43, to the grid of the tube 18, instantly releasing the RF through the surgical instrument or needle. However, with the circuit shown in FIG. 2 attached, the condensers 47 and 48 act to ground the voltage until they are saturated. The values of the condensers are such that in the position at the extreme right only the condenser 47 need be saturated before the firing of the needle. In the intermediate position only the condenser 48 need be saturated. While in the full line position shown in FIG. 2 both condensers must be saturated. As the condensers either singly or together are saturating the voltage to the grid 44 of the tube 18 becomes more and more positive and greater and the tube 18 conducts more and more electricity until the condensers are completely saturated or charged.

FIG. 4 illustrates the board connection for the switching element. Where the device is also provided with the type of needle shown in my copending application, power must be furnished to the solenoid coil which operates the air. This is simultaneous with the throwing of the switch 35. Accordingly, the switch 35 is tied to a switch 54 which connects a source of AC current 55 to a line 56 for the solenoid valve. I have thus provided a circuitry device for discharging a surgical electrical needle or instrument on contact with the human body and designed to operate by the AC field around the human body. In addition a delayed action is provided to permit manipulation of the instrument prior to the electrical discharge. In depilatory work it permits the needle to be completely inserted adjacent the follicle for the discharge. The automatic time control prevents burning, but manual control can be used in surgical work where a constant RF is needed. Other advantages of the present invention will be readily apparent to a person skilled in the art.

I claim:

1. In a circuit for operating a surgical needle or instrument in which an AC current is rectified to DC, oscillated, and then fired through the surgical needle or instrument, a control circuit comprising means for applying an AC field to a human body, means for picking up an AC signal when the surgical needle or instrument contact the human body, a relay, means for energizing said relay, means operable by said AC signal for activating said energizing means, and a switch operable by said relay for initiating operation of the operating circuit when said relay is energized, a condenser on charge, a second relay, said switch connecting said condenser to said second relay, a second switch, said second relay operating said second switch to connect the current to the operating circuit during the discharge of said condenser, said condenser being discharged when said switch is operated to connect said condenser to said second relay.

2. In a circuit for operating a surgical needle or in which an AC current is rectified to DC, oscillated, and then fired through the surgical needle or instrument, a control circuit comprising means for applying an AC field to a human body, means for picking up an AC signal when the surgical needle or instrument contacts the human body, a relay, means for energizing said relay, means operable by said AC signal for activating said energizing means, and a switch operable by said relay for initiating operation of the operating circuit when said relay is energized, said activating means comprising a thyratron tube, a condenser on charge, a second relay, said switch connecting said condenser to said second relay, a second switch, said second relay operating said second switch to connect the current to the operating circuit during the discharge of said condenser, said condenser being discharged when said switch is operated to connect said condenser to said second relay.

3. In a circuit for operating a surgical needle or instrument in which an AC current is rectified to DC, oscillated, and then fired through the surgical needle or instrument, a control circuit comprising means for applying an AC field to a human body, means for picking up an AC signal when the surgical needle or instrument contacts the human body, a relay, means for energizing said relay, means operable by said AC signal for activating said energizing means, and a switch operable by said relay for initiating operation of the operating circuit when said relay is energized, and a manually operable switch between the operating circuit and said needle or instrument for selectively controlling the operation of the operating circuit.

4. In a circuit for operating a surgical needle or instrument in which an AC curent is rectified to DC, oscillated, and then fired through the surgical needle or instrument, a control circuit comprising means for applying an AC field to a human body, means for picking up an AC signal when the surgical needle or instrument contacts the human body, a relay, means for energizing said relay, means operable by said AC signal for activating said energizing means, and a switch operable by said relay for initiating operation of the operating circuit when said relay is energized, said activating means comprising a thyratron tube, and a manually operable switch between the operating circuit and said needle or instrument for selectively controlling the operation of the operating circuit.

5. In a circuit for operating a surgical needle or instrument in which an AC current is rectified to DC, oscillated, and then fired through the surgical needle or instrument, a control circuit comprising means for applying an AC field to a human body, means for picking up an AC signal when the surgical needle or instrument contacts the human body, a relay, means for energizing said relay, means operable by said AC signal for activating said energizing means, and a switch operable by said relay for initiating operation of the operating circuit when said relay is energized, a condenser on charge, a second relay, said switch connecting said condenser to said second relay, a second switch, said second relay operating said second switch to connect the current to the operating circuit during the discharge of said condenser, said condenser being discharged when said switch is operated to connect said condenser to said second relay and a manually operable switch for bypassing said first mentioned switch.

6. In a circuit for operating a surgical needle or instrument in which an AC current is rectified to DC, oscillated, and then fired through the surgical needle or instrument, a control circuit comprising means for applying an AC field to a human body, means for picking up an AC signal when the surgical needle or instrument contacts the human body, a relay, means for energizing said relay, means operable by said AC signal for activating said energizing means, and a switch operable by said relay for initiating operation of the operating circuit when said relay is energized, said activating means comprising a thyratron tube, a condenser on charge, a second relay, said switch connecting said condenser to said second relay, a second switch, said second relay operating said second switch to connect the current to the operating circuit during the discharge of said condenser, said condenser being discharged when said switch is operated to connect said condenser to said second relay and a manually operable switch for bypassing said first mentioned switch.

7. In a circuit for operating a surgical needle or instrument in which an AC current is rectified to DC, oscillated, and then first fired through the surgical needle or instrument, a control circuit comprising means for applying an AC field to a human body, means for picking up an AC signal when the surgical needle or instrument contacts the human body, a relay, means for energizing said relay, means operable by said AC signal for activating said energizing means, and a switch operable by said relay for initiating operation of the operating circuit when said relay is energized, and means for delaying the firing of said operating circuit after the initiating operation of said switch.

8. In a circuit for operating a surgical needle or instrument in which an AC current is rectified to DC, oscillated, and then fired through the surgical needle or instrument, a control circuit comprising means for applying an AC field to a human body, means for picking up an AC signal when the surgical needle or instrument contacts the human body, a relay, means for energizing said relay, means operable by said AC signal for activating said energizing means, and a switch operable by said relay for initiating operation of the operating circuit when said relay is energized, said activating means comprising a thyratron tube, and means for delaying the firing of said operating circuit after the initiating operation of said switch.

9. In a circuit for operating a surgical needle or instrument in which an AC current is rectified to DC, oscillated, and then fired through the surgical needle or instrument, a control circuit comprising means for applying an AC field to a human body, means for picking up an AC signal when the surgical needle or instrument contacts the human body, a relay, means for energizing said relay, means operable by said AC signal for activating said energizing means, and a switch operable by said relay for initiating operation of the operating circuit when said relay is energized, a condenser on charge, a second relay, said switch connecting said condenser to said second relay, a second switch, said second relay operating said second switch to connect the current to the operating circuit during the discharge of said condenser, said condenser being discharged when said switch is operated to connect said condenser to said second relay and means for delaying the firing of said operating circuit after the initiating operation of said switch.

10. In a circuit for operating a surgical needle or instrument in which an AC current is rectified to DC, oscillated, and then fired through the surgical needle or instrument, a control circuit comprising means for applying an AC field to a human body, means for picking up an AC signal when the surgical needle or instrument contacts the human body, a relay, means for energizing said relay, means operable by said AC signal for activating said energizing means, and a switch operable by said relay for initiating operation of the operating circuit when said relay is energized, and a manually operable switch between the operating circuit and said needle or instrument for selectively controlling the operation of the operating circuit, and means for delaying the firing of said operating circuit after the initiating operation of said switch.

11. In a circuit for operating a surgical needle or instrument in which an AC current is rectified to DC, oscillated, and then fired through the surgical needle or instrument, a control circuit comprising means for applying an AC field to a human body, means for picking up an AC signal when the surgical needle or instrument contacts the human body, a relay, means for energizing said relay, means operable by said AC signal for activating said energizing means, and a switch operable by said relay for initiating operation of the operating circuit when said relay is energized, a condenser on charge, a second relay, said switch connecting said condenser to said second relay, a second switch, said second relay operating said second switch to connect the current to the operating circuit during the discharge of said condenser, said condenser being discharged when said switch is operated to connect said condenser to said second relay and a manually operable switch for bypassing said first mentioned switch, and means for delaying the firing of said operating circuit after the initiating operation of said switch.

12. In a circuit for operating a surgical needle or instrument in which an AC current is rectified to DC, oscillated, and then fired through the surgical needle or instrument, a control circuit comprising means for applying an AC field to a human body, means for picking up an AC signal when the surgical needle or instrument contacts the human body, a relay, means for energizing said relay, means operable by said AC signal for activating said energizing means, and a switch operable by said relay for initiating operation of the operating circuit when said relay is energized, and means for delaying the firing of said operating circuit after the initiating operation of said switch, said delaying means including a pair of condensers, said switch selectively connecting said operating circuit to said needle through said condensers, said operating circuit firing only after the charging of said condensers.

13. In a circuit for operating a surgical needle or instrument in which an AC current is rectified to DC, oscillated, and then fired through the surgical needle or instrument, a control circuit comprising means for applying an AC field to a human body, means for picking up an AC signal when the surgical needle or instrument contacts the human body, a relay, means for energizing said relay, means operable by said AC signal for activating said energizing means, and a switch operable by said relay for initiating operation of the operating circuit when said relay is energized, and means for delaying the firing of said operating circuit after the initiating operation of said switch, said delaying means including a pair of condensers, said operating circuit firing only after the charging of said condensers, and a switch for connecting said condensers either singly or in parallel to said firing circuit.

(References on following page)

References Cited

UNITED STATES PATENTS

| | | | |
|---|---|---|---|
| 2,238,344 | 4/1941 | Schuler et al. | 128—303.18 X |
| 2,622,200 | 12/1952 | Hodgson | 128—423 |
| 2,827,056 | 3/1958 | Degelman | 128—422 |

FOREIGN PATENTS

| | | |
|---|---|---|
| 1,275,415 | 10/1961 | France. |
| 897,961 | 6/1962 | Great Britain. |
| 1,139,927 | 11/1962 | Germany. |

RICHARD A. GAUDET, *Primary Examiner.*

W. E. KAMM, *Assistant Examiner.*